(12) United States Patent
Adams

(10) Patent No.: US 7,887,076 B2
(45) Date of Patent: Feb. 15, 2011

(54) PERSONAL VEHICLE

(76) Inventor: Joshua Adams, 419 Springdale Ave., Hatboro, PA (US) 19040-2218

(*) Notice: Subject to any disclaimer, the term of this patent is extended or adjusted under 35 U.S.C. 154(b) by 285 days.

(21) Appl. No.: 12/171,452

(22) Filed: Jul. 11, 2008

(65) Prior Publication Data

US 2010/0007111 A1 Jan. 14, 2010

(51) Int. Cl.
B62M 1/00 (2010.01)
(52) U.S. Cl. .................. 280/210; 280/252; 280/253; 280/257
(58) Field of Classification Search ............ 280/200, 280/210, 220, 221, 251, 252, 253, 254, 255, 280/256, 257, 267
See application file for complete search history.

(56) References Cited

U.S. PATENT DOCUMENTS

| | | | |
|---|---|---|---|
| 3,362,723 A | 1/1968 | Bretholz | |
| 4,411,442 A * | 10/1983 | Rills | 280/221 |
| 4,582,342 A * | 4/1986 | Lew et al. | 280/221 |
| 4,783,091 A * | 11/1988 | Chi | 280/218 |
| 4,861,054 A * | 8/1989 | Spital | 280/221 |
| 5,224,719 A * | 7/1993 | Goodspeed | 280/11.115 |
| 5,310,202 A | 5/1994 | Godspeed | |
| 6,079,724 A | 6/2000 | Lin | |
| 6,227,555 B1 | 5/2001 | Wang et al. | |
| 6,263,990 B1 | 7/2001 | Liu | |
| 6,311,994 B1 | 11/2001 | Wang et al. | |
| 6,334,838 B1 * | 1/2002 | Lee | 482/51 |
| 6,341,790 B1 | 1/2002 | Chen | |
| 6,505,845 B1 * | 1/2003 | Fong | 280/228 |
| 6,585,277 B1 * | 7/2003 | Monteagudo | 280/244 |
| 6,857,648 B2 | 2/2005 | Mehmet | |
| 7,192,038 B2 * | 3/2007 | Tsai | 280/87.041 |
| 7,419,175 B2 * | 9/2008 | Smith | 280/221 |
| 2002/0105160 A1 * | 8/2002 | Yen | 280/252 |
| 2008/0054588 A1 * | 3/2008 | Walker | 280/221 |
| 2008/0088109 A1 | 4/2008 | Chiu et al. | |

* cited by examiner

*Primary Examiner*—Lesley Morris
*Assistant Examiner*—Marc A Scharich
(74) *Attorney, Agent, or Firm*—Howson & Howson LLP

(57) ABSTRACT

A skateboard-like personal vehicle comprises a platform, a pair of steerable front wheels controlled by an upright steering lever movable left or right about a longitudinal pivot axis by one hand of the rider, a pair of rear wheels, one of which is driven by a reciprocable foot pedal, and an upright post which can be gripped by the rider's other hand.

8 Claims, 6 Drawing Sheets

PERSONAL VEHICLE

FIELD OF THE INVENTION

This invention relates to a vehicle for personal transportation, and more particularly to a wheeled vehicle on which an individual stands while riding, and having a unique steering feature.

BACKGROUND OF THE INVENTION

Most personal transportation vehicles on which the user is in a standing position while riding fall into one of three categories. The first is the scooter, which typically has a front wheel and one or more rear wheels, the front wheel being steerable by a handlebar. A second is the skateboard, which typically has sets of front and rear wheels rotatable on axes that are either fixed to a platform on which the rider stands, or arranged on steering trucks that can change direction. In either case, the rider steers the skateboard by shifting his weight. A third category, of which the SEGWAY personal mobility device is the most notable example, is a vehicle having two wheels on a common axis, and is also steered by a shift in the rider's weight. Scooters and skateboards can be motorized or propelled by the rider. Most vehicles in the third category are motor-propelled.

Examples of personal vehicles are described in the following United States patents and United States Patent Publication:

| | |
|---|---|
| 3,362,723 | Bretholz |
| 5,310,202 | Goodspeed |
| 6,079,724 | Lin |
| 6,227,555 | Wang et al. |
| 6,311,994 | Wang et al. |
| 6,341,790 | Chen |
| 6,857,648 | Mehmet |
| 2008/0088109 | Chiu et al. |

U.S. Pat. Nos. 3,362,723, 6,079,724, 6,311,994, 6,857,648, and patent publication 2008/0088109 describe scooters having foot-actuated pedal mechanisms for propulsion. Of these, U.S. Pat. Nos. 3,362,723, 6,079,724, 6,857,648, and patent publication 2008/0088109, all utilize conventional handlebar steering mechanisms for tilting the axis of rotation of a front steering wheel.

U.S. Pat. No. 5,310,202 describes a skateboard having a rider-actuable propulsion pedal and steering trucks that facilitate steering by a shift in weight.

U.S. Pat. No. 6,227,555 describes a scooter having a pair of rear wheels that are steerable in response to a shift in the rider's weight. U.S. Pat. No. 6,341,790 describes a scooter having a pair of front wheels that are steerable in response to a shift in the rider's weight.

In riding any of the scooters that have handlebar steering, the rider holds onto the handlebar with both hands. These scooters are relatively easy for an inexperienced rider to use, but the rider must therefore face forward in order to steer comfortably. Skateboards, on the other hand, and scooters that require a shift of weight for steering, are comparatively difficult for an inexperienced rider to master, and a rider can easily incur injuries from falls while attempting to learn how to use these devices.

An object of this invention is to provide a personal vehicle that allows a rider to face to the side while riding, and thereby experience the sensation of riding a skateboard, while at the same time allowing an inexperienced rider to steer easily and more safely.

SUMMARY OF THE INVENTION

The personal vehicle according to the invention comprises a platform capable of supporting a human rider standing thereon. A first pair of wheels is connected in supporting relationship with the platform, the wheels of the first pair being in coaxial relationship with each other along a horizontal axis. A propulsion mechanism can be connected in driving relationship to at least one wheel of the first pair. A second pair of wheels is spaced from the horizontal axis of the first pair. The wheels of the second pair are both pivoted about substantially vertical pivot axes and connected together by a linkage constraining them to pivot together about the substantially vertical pivot axes for steering the vehicle. An upright lever is connected to the linkage and has a handle positioned to be gripped by one hand of a rider standing on the platform. The upright lever is pivoted, at an intermediate location between the linkage and the handle, for swinging movement about a pivot axis lying in an imaginary vertical plane to which the horizontal axis of the first pair of wheels is perpendicular. The vehicle is steered by swinging movement of the upright lever.

In a preferred embodiment of the invention, an upright post is provided at a location spaced from the upright lever in the direction from the front end to the rear end of the platform. The upright post is fixed to the platform and extends upward therefrom, and includes a handle positioned to be gripped by the other hand of the rider standing on the platform.

The propulsion mechanism preferably comprises a pedal reciprocably operable by a foot of the rider, and a transmission connecting the pedal to said at least one wheel of the first pair. The transmission preferably includes a one-way clutch for maintaining a driving relationship between the pedal and said at least one wheel when the pedal is pushed in a first direction by a foot of the rider, and allowing free rotation of said at least one wheel when the pedal is not being pushed in said first direction.

The vehicle preferably includes an upright support fixed to the platform, and the upright lever is pivoted on said upright support for swinging movement about its pivot axis.

In a preferred embodiment, the wheels of the second pair are both pivoted for steering movement about parallel, substantially vertical, axes. The linkage includes first and second arms connected respectively to the two wheels of the second pair, and a tie rod connecting the arms. The upright lever is connected to the tie rod at a location below said pivot axes.

The rider can stand on the platform facing to the side, with one foot in front of the other, as if riding a skateboard, but can steer, without utilizing a weight shift, by moving the upright lever to the left or right. Moreover, if the vehicle is equipped with an upright post fixed to the platform, the rider can steer with one hand and hold onto the upright post with the other hand, thereby avoiding an accidental spill due to a loss of balance.

Further objects and advantages of the invention will be apparent from the following description when read in conjunction with the drawings.

DETAILED DESCRIPTION OF THE PREFERRED EMBODIMENTS

Figure 1:
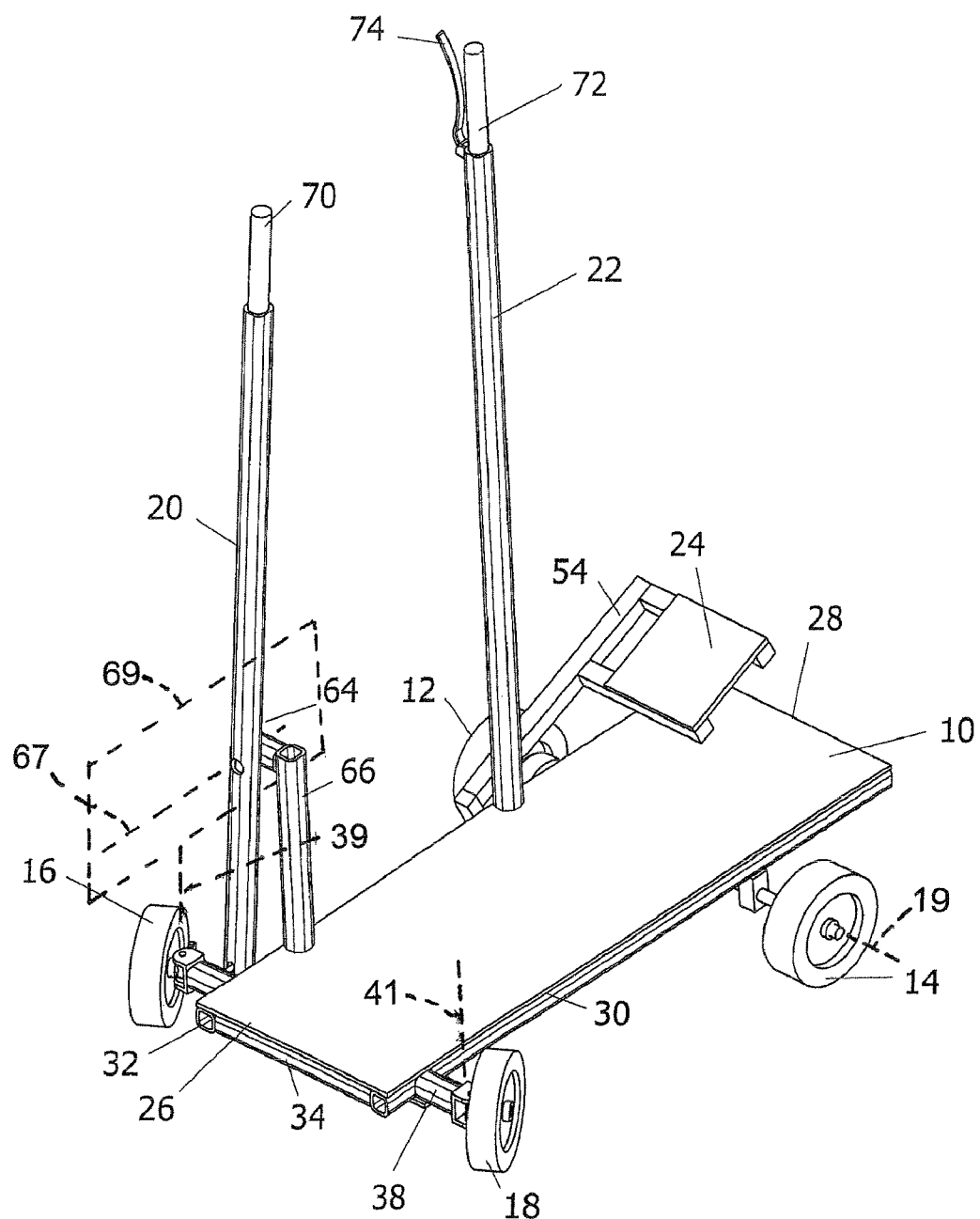
FIG. 1 is an oblique perspective view of a preferred embodiment of the vehicle in accordance with the invention.

As shown in FIGS. 1-4, in the vehicle according to the preferred embodiment of the invention, a rigid, generally rectangular, platform 10 is supported on a carriage comprising a pair of rear wheels 12 and 14, and a pair of front wheels 16 and 18. The vehicle is equipped with an upright steering lever 20, a post 22, fixed to the platform, and a propulsion pedal 24.

The platform 10 has a front end 26 and a rear end 28, and is preferably elongated in a longitudinal direction extending from the front end to the rear end, and sufficiently long to enable a human rider to occupy the vehicle while facing toward the side, i.e., facing in a direction perpendicular to the longitudinal direction of the platform, with at least one foot on the platform and the other foot spaced longitudinally from the one foot. In the vehicle shown, the rider will ordinarily stand with the left foot on the platform near the front end 26, and with the right foot either on the platform near the rear end 28 or engaged with propulsion pedal 24.

The platform can be composed of any of a variety of materials such as plywood, fiber-reinforced plastics such as glass fiber-reinforced polyester resin, or metal, e.g., steel or aluminum. Depending on the strength and rigidity of the platform, it can be mounted on a frame. In the vehicle shown, the platform 10 is mounted on a frame consisting of a set of rectangular metal tubes including longitudinal tubes 30 and 32, respectively secured underneath the left and right side edges of the platform, a tube 34 secured underneath the front edge of the platform, and a similar tube 36 (FIG. 5) secured underneath the rear edge of the platform.

The platform, and its tubular frame are supported by a carriage comprising the four wheels 12, 14, 16 and 18, the rear wheels 12 and 14 being a first set, and the front wheels 16 and 18 being a second set. The rear wheels 12 and 14 are rotatable on a common horizontal axis 19 located near the rear end 28 of the platform and extending horizontally and perpendicular to the longitudinal direction of the platform.

Figure 2:
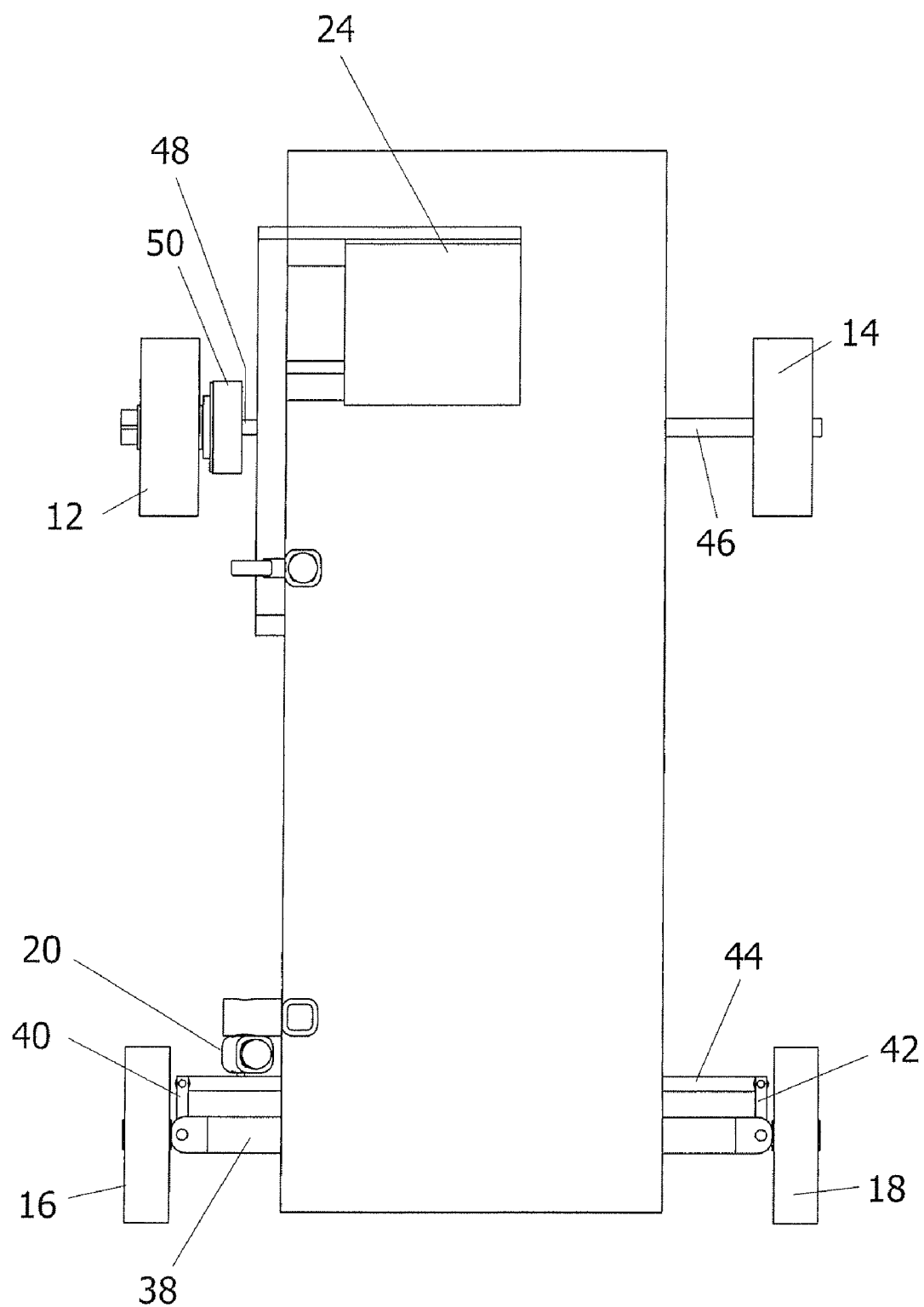
FIG. 2 is a top plan view of the vehicle.
Figure 3:
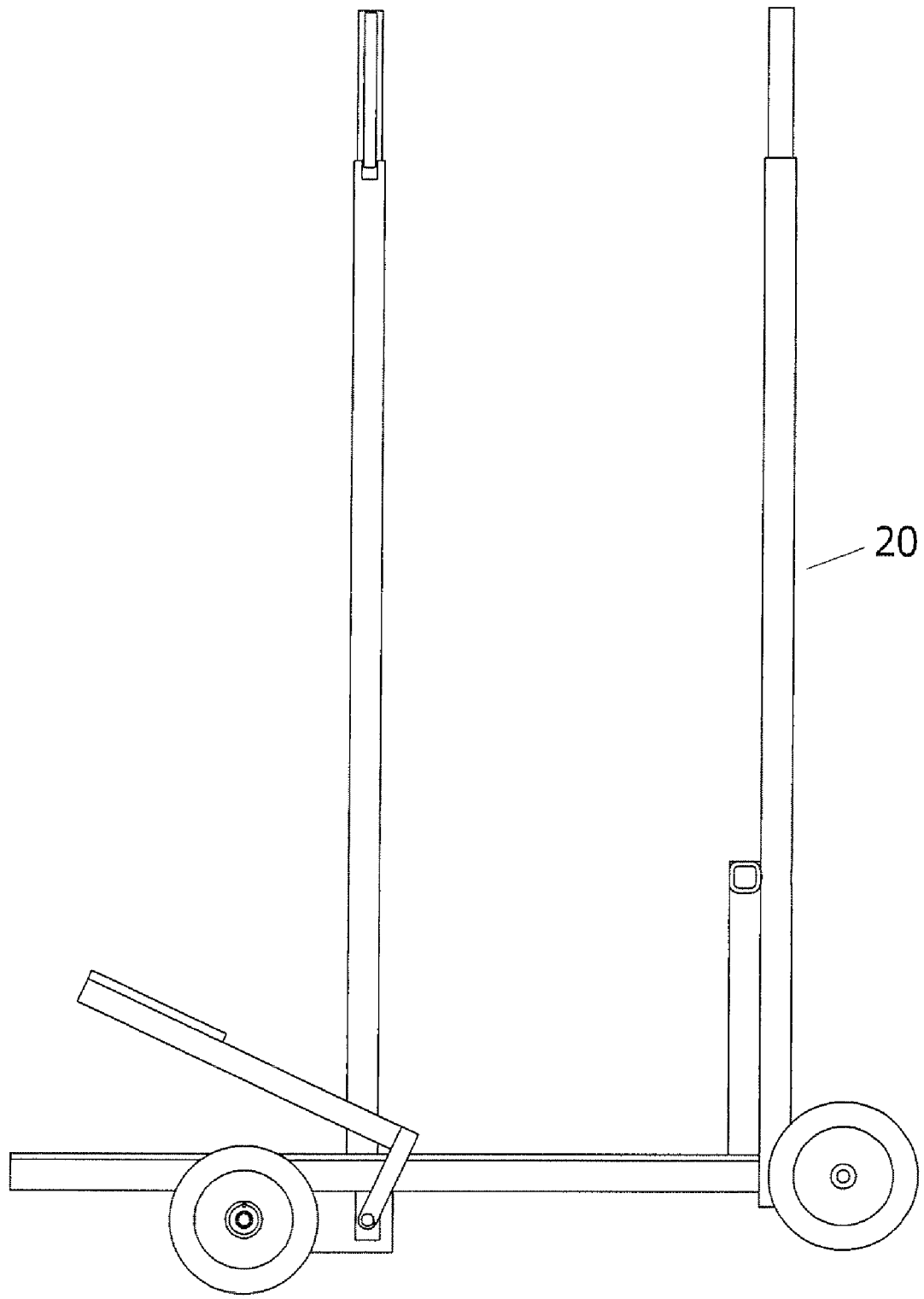
FIG. 3 is a right side elevational view of the vehicle.
Figure 4:
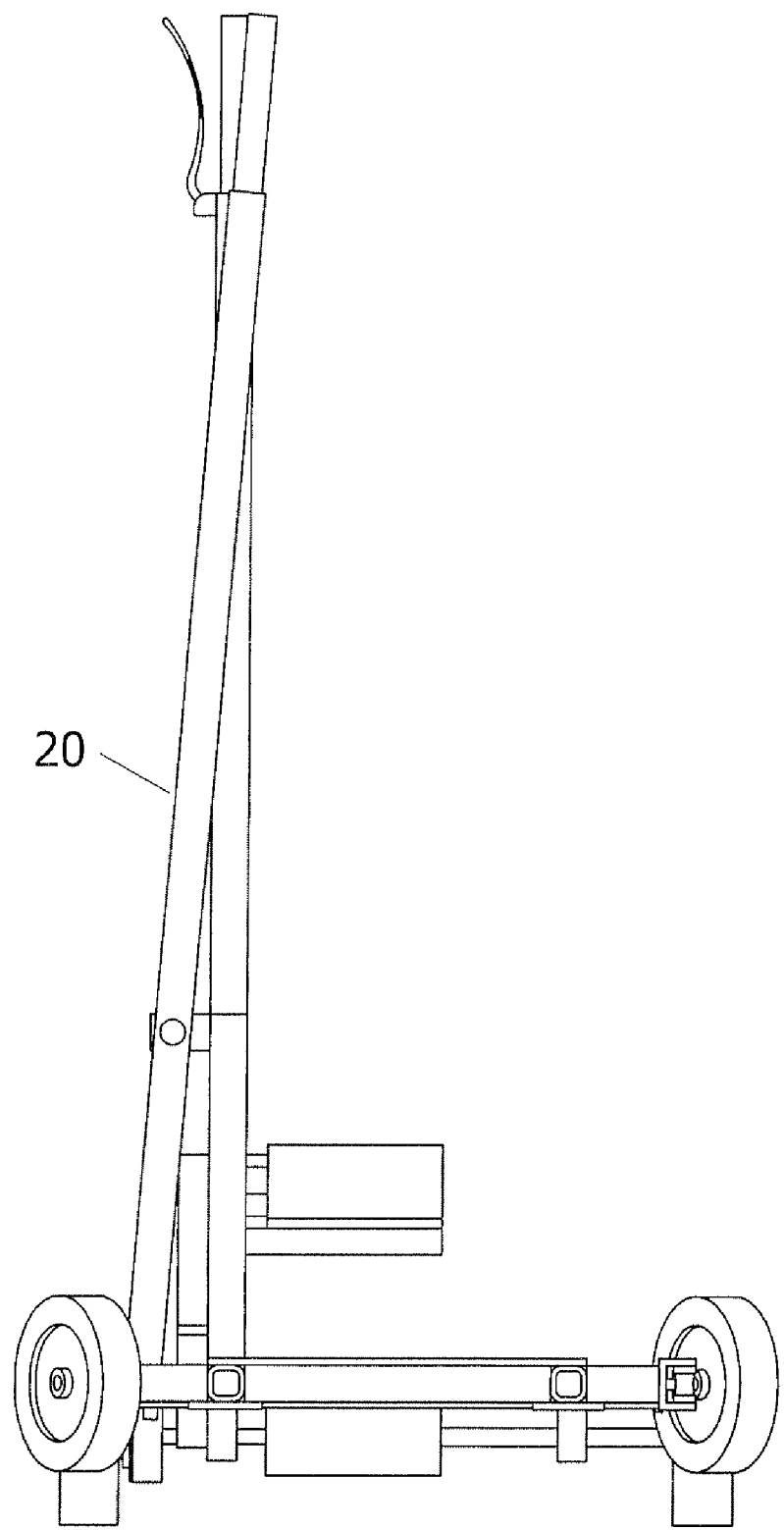
FIG. 4 is a front elevational view of the vehicle.

As shown in FIG. 2, the front wheels are pivoted about pivot axes 39 and 41 at opposite ends of a frame member 38 that extends parallel to, and behind, the front frame tube 34. The pivot axes are substantially vertical, but can be tilted slightly to achieve appropriate caster, camber, or both. Steering arms 40 and 42, which are connected to wheels 16 and 18 respectively, are connected by a tie rod 44, which controls the steering direction of the wheels.

Figure 5:
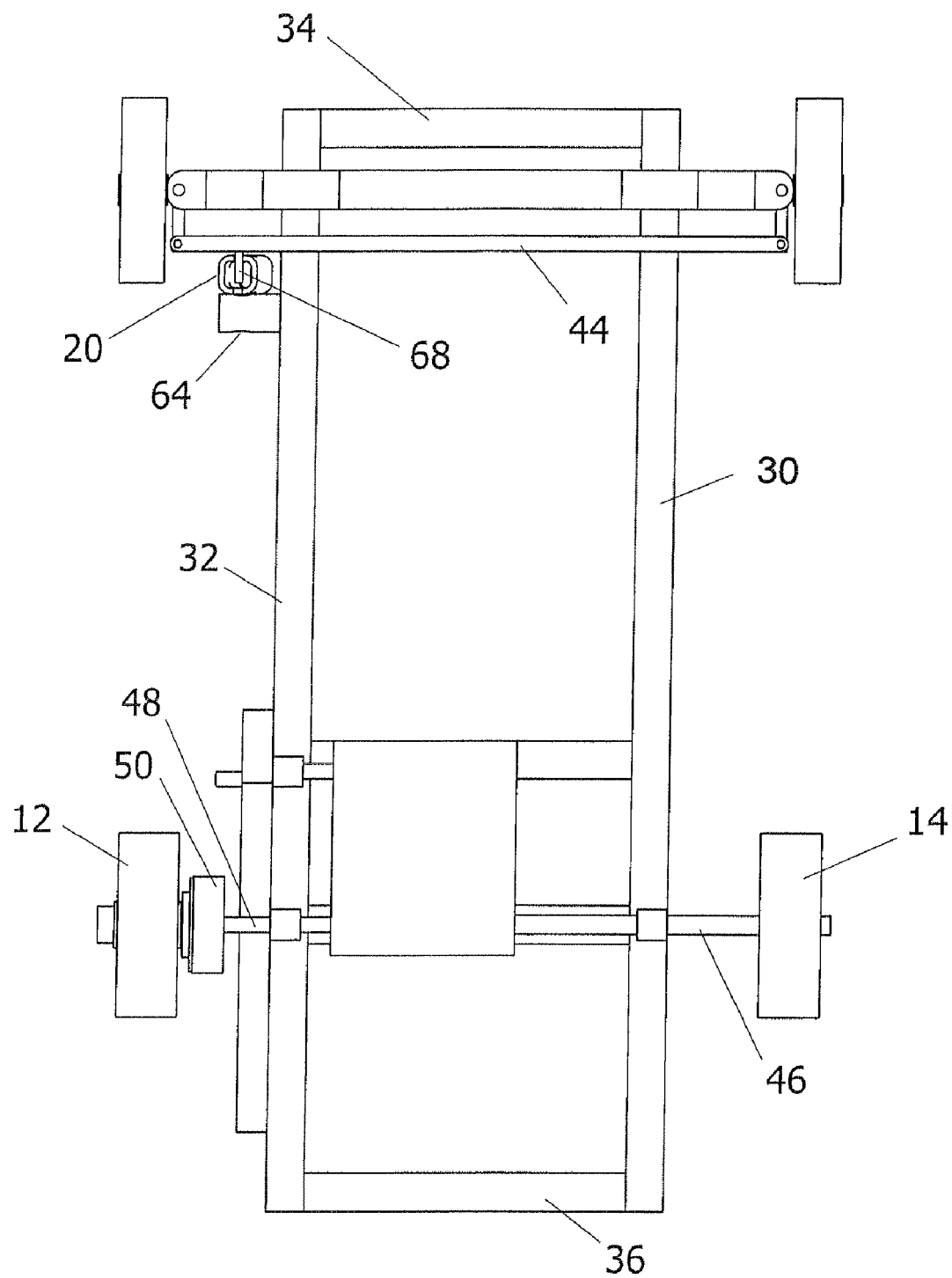
FIG. 5 is a bottom plan view of the vehicle.

The rear wheels 12 and 14 are preferably rotatable independently of each other. Wheel 14 is freely rotatable on an axle 46, while wheel 12 is driven by a shaft 48 through a clutch 50, as shown in FIGS. 2 and 5. The clutch 50 is a one-way clutch, allowing rotation of wheel 12 relative to shaft 48 in a direction to effect forward movement of the vehicle, but preventing rotation of wheel 12 relative to shaft 48 in the opposite direction. The clutch transmits a forward driving force from shaft 48 to wheel 12 but allows wheel 12 to rotate in a "freewheeling" manner while shaft 48 rotates in the opposite direction. Consequently, the clutch provides for forward propulsion of the vehicle in response to reciprocatory rotation of shaft 48.

Figure 6:
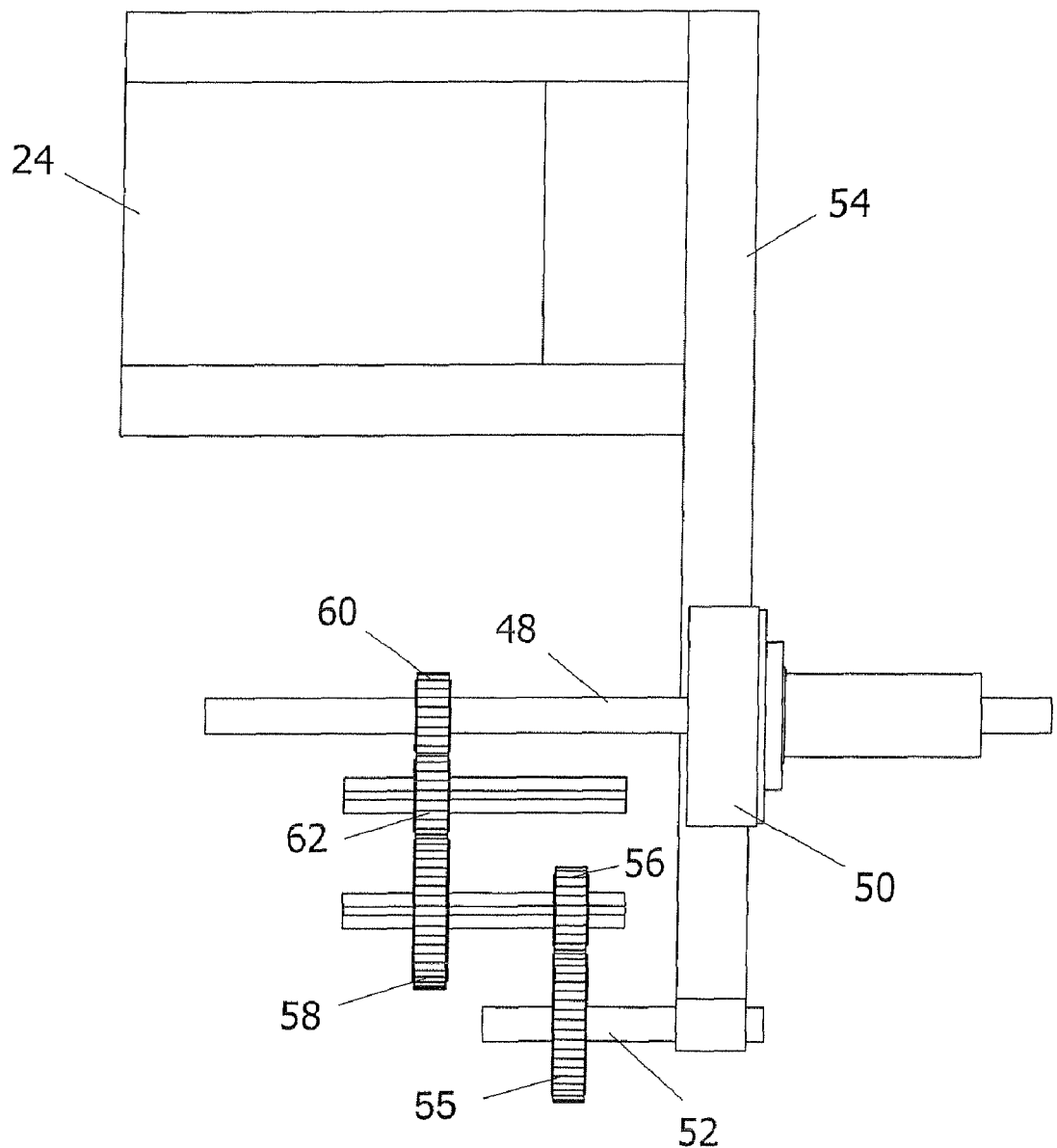
FIG. 6 is a bottom plan view of a drive train in a pedal-propelled embodiment of the vehicle.

Reciprocatory rotation of shaft 48 is, in turn, effected by a pumping action on foot pedal 24 which operates shaft 48 through the gear train illustrated in FIG. 6. As shown in FIG. 6, pedal 24 connected to a shaft 52 through an arm 54. Arm 54 is fixed to shaft 52, which is rotatable in bearings (not shown). A gear 55 on shaft 52 meshes with an intermediate gear 56 on a common shaft with gear 58. Gear 58, in turn, drives gear 60, which is fixed to shaft 48 through an intermediate gear 62. Thus, depression of pedal 24 causes shaft 48 to rotate in a direction such that wheel 12 propels the vehicle forward.

As shown in FIGS. 1-5, the steering lever 20 is pivoted to a bracket 64, which extends laterally from the upper end of a post 66 fixed to tube 32 of the frame. The lever 20 is pivotable about a pivot axis 67 that lies in an imaginary vertical plane 69 to which the axis of the rear wheels is perpendicular. Therefore, the pivot axis 67 of lever 20 extends approximately parallel to the longitudinal direction of the platform.

As shown in FIG. 5, the lower end of lever 20 is pivoted on a pin 68 fixed to tie rod 44. Thus, when the handle 70 (FIG. 1) at the upper end of the lever 20 is pushed to the right, the tie rod will move to the left causing the front wheels to steer to the right. Similarly, when the handle 70 is pushed to the left, the tie rod will move to the right causing the front wheels to steer to the left.

The pivot axis of the lever 20, i.e., the pivot axis through the bracket at the upper end of post 66, is preferably located approximately one-fourth the distance from the lower end to the upper end of the lever 20. The position of the pivot axis gives the rider the mechanical advantage necessary to steer the vehicle, while allowing the lever at all times to be upright, that is, not more than about 10 degrees from vertical. With a lever four feet long, the tie rod can be moved through a range of two inches, left to right, in response to a six inch, or approximately 9.5 degree, swing of the lever (4.75 degrees to the right or left of vertical). This 9.5 degree swing of the lever is more than adequate to steer the vehicle, and does not require the rider to reach so far as to lose his balance. Furthermore, to the extent that the rider leans while steering, he tends to lean in the direction in which the vehicle is steered, and consequently the rider's own inertia helps to maintain balance.

The rider can also hold onto the handle 72 at the upper end of fixed post 22 with the other hand to maintain balance. The handle 72 can be equipped with a brake lever 74 coupled to a brake (not shown) through a Bowden wire, a linkage, or other suitable brake control mechanism.

In riding the vehicle shown in FIG. 1, the rider stands facing to the right, with his left foot on the platform just behind the front wheel supporting frame member 38, with his right foot on pedal 24, and with his left and right hands respectively gripping handles 70 and 72. The rider can propel the vehicle forward by depressing pedal 24 repeatedly, and can coast on level pavement or downhill without depressing the pedal. The direction of travel can be controlled easily by movement of handle 70 to the right or left.

Various modifications can be made to the vehicle described. For example, although the vehicle shown in the drawings has its steering lever 20 and post 22 on the right, the steering lever and post, or either of them can be located on the left. Likewise the pedal can be positioned on the left, if desired, irrespective of the positions of the posts. The foot pedal can, of course, be arranged to drive either or both of the rear wheels. It is also possible to support the steering lever at a central location between the right and left sides of the vehicle by providing a slot in the platform through which the steering lever can extend, or by providing a suitable linkage to connect the lower end of the steering lever to the tie rod.

It is also possible to modify the vehicle by making the rear wheels steerable and to utilize the front wheels for propulsion. With such a configuration, a right-handed rider could steer with his right hand while facing to the right.

Suspension systems, for example a suspension comprising springs, shock absorbers, or combinations of springs and shock absorbers, can be incorporated into the vehicle.

The transmission can be a multi-speed transmission, utilizing a conventional clutch and gearshift mechanism of the kind commonly used in a motorcycle or motorscooter. The clutch and gearshift controls can be provided at any of various locations. For example, the controls can be hand-operated controls incorporated at the upper end of post 22 along with the brake lever 74.

The foot pedal can be eliminated altogether in a modified version of the vehicle designed for downhill operation or for propulsion by direct contact between the rider's foot and the roadway. Finally, the foot pedal can be eliminated in favor of, or supplemented by, a small internal combustion engine or electric motor for propulsion. In such a case, an engine throttle control or motor speed control can be provided at the location of one or the other of handles 70 and 72.

Still other modifications can be made to the vehicle described without departing from the scope of the invention as defined by the following claims.

What is claimed is:

1. A personal vehicle comprising a platform elongated along a direction of elongation, a pair of steerable front wheels controlled by an upright steering lever having a first handle, the steering lever being movable left or right, by one hand of a rider standing on the platform and gripping said first handle, about a longitudinal pivot axis extending along said direction of elongation of the platform, a pair of rear wheels, and an upright post attached to the platform at a location spaced from said upright steering lever along said direction of elongation, the upright post having a second handle positioned substantially opposite said first handle, at a height such that it can be gripped by the rider's other hand for supporting the rider while the rider is standing on the platform and gripping said first handle.

2. A personal vehicle according to claim 1, including a propulsion mechanism, in driving relationship with at least one of said rear wheels.

3. A personal vehicle comprising:
   a platform having a front end, a rear end, and a length extending in a direction from the front end to the rear end, said length of the platform being sufficient to enable a human rider to occupy the vehicle, facing perpendicular to said direction, with at least one foot of the rider on the platform and the other foot of the rider spaced from said at least one foot along said direction;
   a carriage connected to the platform for enabling the platform to travel along a road surface, the carriage comprising a first set of wheels positioned adjacent one of the front and rear ends of the platform, and a second set of wheels positioned adjacent the other of said front and rear ends of the platform; and
   a steering mechanism connected to the wheels of the second set;
   the steering mechanism comprising a linkage connecting the wheels of the second set together for steering said wheels of the second set together left and right relative to said direction from the front to the rear of the platform, and an upright lever connected to the linkage and having a handle positioned to be gripped by one hand of a rider standing on the platform, the upright lever being pivoted, at an intermediate location between the linkage and the handle, for swinging movement about a pivot axis lying in an imaginary vertical plane to which said direction from the front end to the rear end of the platform is parallel
   the vehicle including an upright post at a location spaced from said upright lever in said direction from the front end to the rear end of the platform, said post being fixed to the platform and extending upward therefrom, and including a handle positioned to be gripped by the other hand of said rider standing on the platform.

4. A personal vehicle according to claim 3, including a propulsion mechanism connected in driving relationship to at least one wheel of the first set of wheels.

5. A personal vehicle according to claim 3, including a propulsion mechanism connected in driving relationship to at least one wheel of the first set, in which the propulsion mechanism comprises a pedal reciprocably operable by said other foot of the rider, and a transmission connecting said pedal to said at least one wheel of the first set of wheels.

6. A personal vehicle according to claim 3, including a propulsion mechanism connected in driving relationship to at least one wheel of the first set, in which the propulsion mechanism comprises a pedal reciprocably operable by said other foot of the rider, and a transmission connecting said pedal to said at least one wheel of the first set, the transmission including a one-way clutch for maintaining a driving relationship between the pedal and said at least one wheel when the pedal is pushed in a first direction by said other foot of the rider, and allowing free rotation of said at least one wheel when the pedal is not being pushed in said first direction.

7. A personal vehicle according to claim 3, including an upright support fixed to said platform, and in which said upright lever is pivoted on said upright support for the swinging movement about said pivot axis.

8. A personal vehicle comprising:
   a platform having a front end, a rear end, and a length extending in a direction from the front end to the rear end, said length of the platform being sufficient to enable a human rider to occupy the vehicle, facing perpendicular to said direction, with at least one foot of the rider on the platform and the other foot of the rider spaced from said at least one foot along said direction;
   a carriage connected to the platform for enabling the platform to travel along a road surface, the carriage comprising a first set of wheels positioned adjacent one of the front and rear ends of the platform, and a second set of wheels positioned adjacent the other of said front and rear ends of the platform; and
   a steering mechanism connected to the wheels of the second set;
   the steering mechanism comprising a linkage connecting the wheels of the second set together for steering said wheels of the second set together left and right relative to said direction from the front to the rear of the platform, and an upright lever connected to the linkage and having a handle positioned to be gripped by one hand of a rider standing on the platform, the upright lever being pivoted, at an intermediate location between the linkage and the handle, for swinging movement about a pivot axis lying in an imaginary vertical plane to which said direction from the front end to the rear end of the platform is parallel;

in which the wheels of the second set consist of two wheels, both pivoted for steering movement about parallel, substantially vertical, axes, in which said linkage includes first and second arms connected respectively to the two wheels of the second set, and a tie rod connecting said first and second arms, and in which the upright lever is connected to said tie rod at a location below said pivot axis.

* * * * *